March 25, 1930.   G. E. WEBB   1,751,671
WATER SOFTENER
Filed Dec. 15, 1928
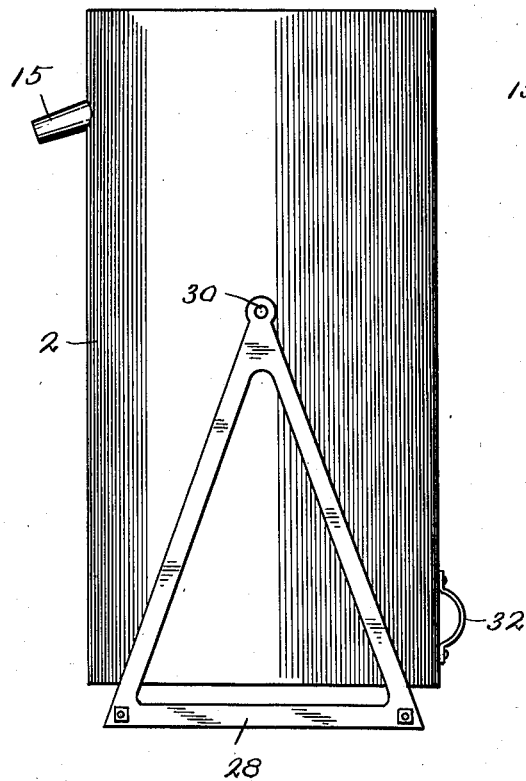
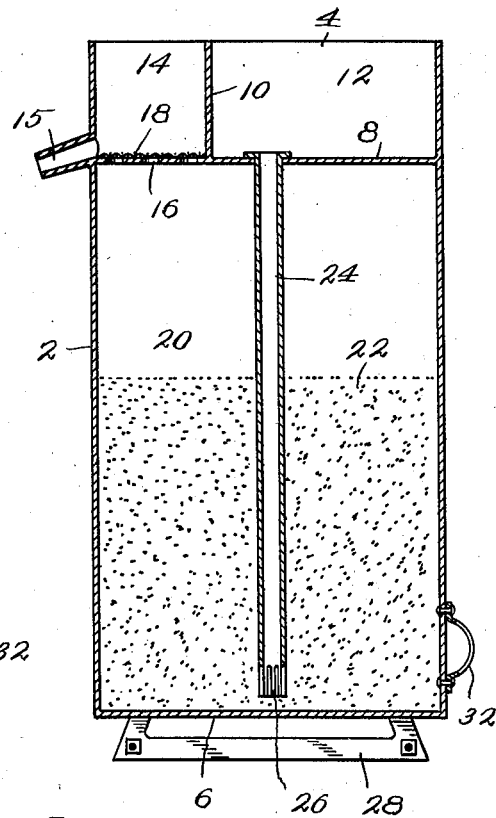
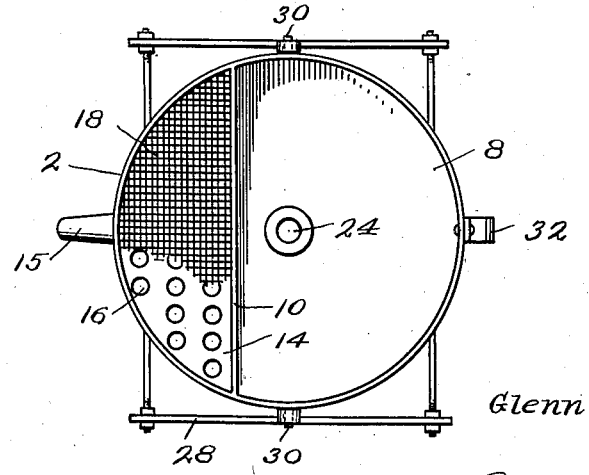
Inventor,
Glenn E. Webb,
By F. G. Fischer,
Attorney.
Witness:
Fred C. Fischer.

Patented Mar. 25, 1930

1,751,671

UNITED STATES PATENT OFFICE

GLENN E. WEBB, OF KANSAS CITY, MISSOURI

WATER SOFTENER

Application filed December 15, 1928. Serial No. 326,221.

My invention relates to apparatus for purifying and softening water and one object is to provide a simple and inexpensive apparatus of this character which is self-contained and free from valves and other expensive fittings.

A further object is to provide a portable apparatus requiring no pipe connections with a water supply and which is especially desirable for domestic use and around gasoline filling stations where soft water is desired for filling automobile radiators, etc.

Another object is to mount the container through which the water flows in such manner that said container can be readily turned upside down to agitate and free the water softening agent therein of impurities collected from the raw water treated in the apparatus.

Other objects will hereinafter appear, and in order that the invention may be fully understood reference will now be had to the accompanying drawing, in which:

Fig. 1 is a side elevation of a water softening apparatus constructed in accordance with my invention.

Fig. 2 is a central vertical section of the apparatus.

Fig. 3 is a plan view of the apparatus.

In carrying out the invention I employ a container 2 consisting of a sheet metal or other suitable tank which is open at its upper end 4 and closed at its lower end 6.

8 designates a horizontal partition extending across the upper portion of the container 2 and in conjunction with a vertical partition 10 divides said container into shallow inlet and outlet chambers 12 and 14, respectively, and a relatively deep chamber 20. A discharge spout 15 leads from the outlet chamber 14 at a point just above the horizontal partition 8, which latter has openings 16 covered with a screen 18 and communicating with the chambers 14 and 20. A bed 22 of zeolites or other water softening and purifying agents is placed in the large chamber 20.

24 designates a distributing pipe depending from the partition 8 into the chamber 20. Said pipe 24 extends downwardly into the bed 22 and terminates in a slotted lower end 26 near the bottom 6 of the container.

28 designates a suitable stand upon which the container 2 is operably mounted as by trunnions 30, so that said container may be readily turned upside down with the aid of the handle 32 for the purpose of agitating and freeing the water softening bed of impurities collected from the raw water.

In practice water introduced into the inlet chamber 12 descends in the distributing pipe 24 from which it discharges into the lower portion of the water-softening bed 22. As the supply of water to the inlet chamber 12 is continued the water discharged from the pipe 24 flows upwardly through the bed 22 and the openings 16, and escapes in the form of soft water from the spout 15.

After the bed 22 has collected impurities from the raw water to such an extent as to become inefficient in softening the water it may be freed from such impurities by inverting the container 2, which operation can be readily accomplished by grasping the handle 32 and pulling backwardly and upwardly thereon. As the container 2 is inverted the material forming the bed 22 runs down upon the partition 8, but is prevented from falling out through the openings 16 by the screen 18. If desired the bed 22 may also be treated with a revivifying salt to better fit it for reuse in the further purification and softening of water.

From the foregoing description it is apparent that I have provided a water softening apparatus of exceedingly simple and inexpensive construction embodying the advantages above pointed out, and while I have shown one form of such apparatus I reserve all rights to such other forms and modifications thereof as properly fall within the spirit and scope of the invention as claimed.

Having thus described my invention, what I claim and desire to secure by Letters Patent, is:

A water softening apparatus consisting of a container open at its upper end and closed at its lower end, a horizontal partition extending across the upper portion of the container for dividing the latter into a shallow upper chamber and a large lower chamber, which latter is adapted to hold filtering material, a vertical partition extending upwardly from said horizontal partition and dividing the shallow chamber into an inlet chamber and an outlet chamber which latter communicates with the large chamber through an opening in the horizontal partition, a screen extending across said opening, a pipe leading downwardly from the inlet chamber to within a short distance of the bottom of the large chamber, and a spout leading from the outlet chamber.

In testimony whereof I affix my signature.

GLENN E. WEBB.